(12) United States Patent
Sharma et al.

(10) Patent No.: US 7,197,955 B2
(45) Date of Patent: Apr. 3, 2007

(54) GEARBOX SHIFT ACTUATOR

(75) Inventors: Sumit Sharma, Brookline, MA (US);
William Farmer, Acton, MA (US);
Robert Cicerchia, Sharon, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 107 days.

(21) Appl. No.: 11/108,351

(22) Filed: Apr. 18, 2005

(65) Prior Publication Data
US 2005/0284247 A1 Dec. 29, 2005

Related U.S. Application Data

(60) Provisional application No. 60/563,164, filed on Apr. 16, 2004.

(51) Int. Cl.
*F16H 59/00* (2006.01)
*H02K 7/10* (2006.01)
*B60K 6/04* (2006.01)

(52) U.S. Cl. .................. 74/335; 310/75 R; 318/10

(58) Field of Classification Search .............. 74/335, 74/336 R; 192/53.1, 48.2, 48.9, 48.91; 310/75 R, 310/78, 83, 98, 99, 100; 318/9–10, 14–15
See application file for complete search history.

(56) References Cited

U.S. PATENT DOCUMENTS

| | | | | | |
|---|---|---|---|---|---|
| 3,682,283 | A | * | 8/1972 | Sato | .................. 192/141 |
| 4,449,416 | A | * | 5/1984 | Huitema | ................ 74/336 R |
| 5,517,876 | A | * | 5/1996 | Genise et al. | ........... 74/473.24 |
| 5,689,997 | A | * | 11/1997 | Schaller | ................ 74/335 |
| 5,775,469 | A | * | 7/1998 | Kang | .................. 188/267 |
| 5,788,008 | A | * | 8/1998 | Fort et al. | ................ 180/247 |

\* cited by examiner

*Primary Examiner*—Roger Pang
(74) *Attorney, Agent, or Firm*—Grossman, Tucker, Perreault & Pfleger, PLLC

(57) ABSTRACT

A vehicle gear box shift actuator and apparatus including the same. The actuator includes a lead screw; a drive nut threaded on the lead screw; a plunger; a first spring disposed between the drive nut and a first end of the plunger; a second spring disposed between the drive nut and a second end of the plunger opposite from the first end.

16 Claims, 3 Drawing Sheets

GEARBOX SHIFT ACTUATOR

CROSS-REFERENCE TO RELATED APPLICATIONS

The present application claims the benefit of U.S. provisional patent application Ser. No. 60/563,164, filed on Apr. 16, 2004, which is incorporated herein by reference.

TECHNICAL FIELD

The present invention relates in general to a vehicle gearbox shift actuator.

BACKGROUND

In recent years, commercial vehicles, sport utility vehicles and passenger vehicles capable of full-time or part-time 4-wheel drive and/or all-wheel-drive operation have become commonplace. In some configurations, the operator has the option of selecting 2-wheel or 4-wheel drive depending on the conditions at any given time. The vehicle may also, or alternatively, be configured to automatically move from one drive train or suspension operating condition to another condition based on road conditions sensed by the vehicle. For example, the vehicle may move from 2-wheel drive to 4-wheel drive, or may selectively drive particular wheels, when slippery road conditions are encountered. Connection and disconnection of a vehicle suspension stabilizer may also be established, either manually or automatically, due to road conditions.

To establish these changes in drive train or suspension operating conditions, a vehicle may be equipped with one or more electro-mechanical actuators, e.g. for changing the state of the front and/or rear differential, transfer case, and/or stabilizer bar system. Cost and reliability of such actuators are, of course, important considerations. There is thus a continuous need for cost-effective and reliable vehicle gear box shift actuators.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

For ease of explanation, an actuator consistent with the invention may be described herein in connection operation of a differential, i.e. a front differential, of a 4-wheel drive vehicle. It will be recognized, however, that an actuator consistent with the invention will be useful in establishing a change of operating condition in a variety of gear box applications, in and out of vehicles. For example, an actuator consistent with the invention may be used to manipulate the condition of a vehicle front differential, rear differential, transfer case, stabilizer bar system, etc. It is to be understood, therefore, that illustrated exemplary embodiments described herein are provided only by way of illustration, and are not intended to be limiting.

Figure 1:
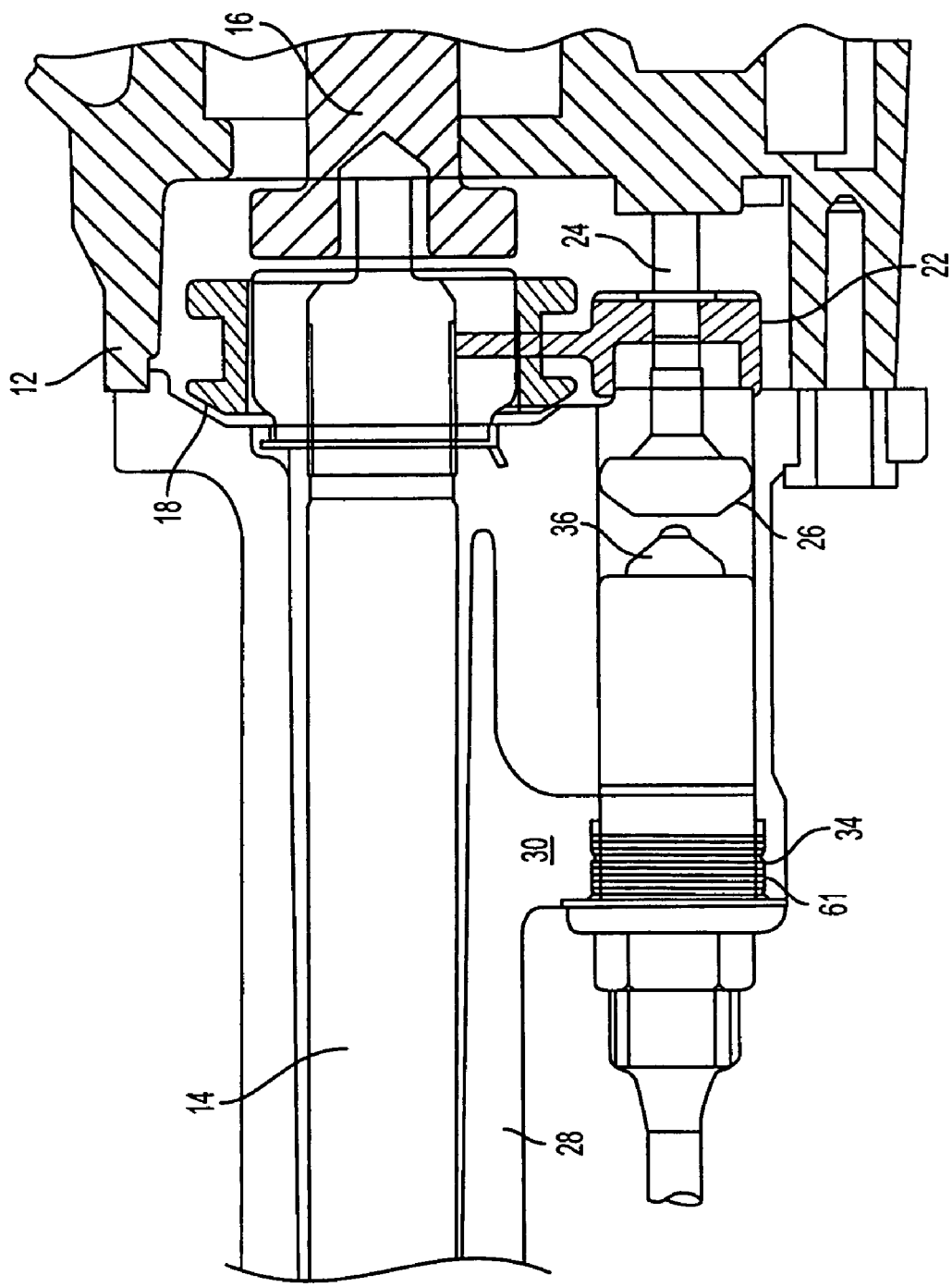
FIG. 1 is a view partly in section of one exemplary embodiment of an actuator consistent with the invention associated with a differential of a 4-wheel drive vehicle.

In FIG. 1, there may be seen in part a front differential housing 12 similar to those utilized in some 4-wheel drive vehicles. Extending out from the housing to the left is a wheel output shaft 14 and extending outward through the housing to the right is a differential output shaft 16. In one vehicle configuration, when the vehicle is proceeding normally with 2-wheel drive in operation, only the rear wheels may be driving the vehicle and the front differential may be set up as it appears in FIG. 1. That is, there may be no direct connection between the differential output shaft 16 and the wheel output shaft 14.

In that circumstance, an internally splined ring 18 may be engaged on the externally splined end of the wheel output shaft 14. The axial position of the splined ring 18 on the wheel output shaft 14 may be controlled by a fork 22. The fork 22 may be mounted on a reciprocating shaft 24 having an end knob 26, and may be normally urged in a leftward direction by a spring. The wheel output shaft 14 may be surrounded by an enclosure 28 having a radial extension 30.

In the illustrated exemplary embodiment, the extension 30 includes an opening formed through its wall which is threaded to receive matching threads of the body of an actuator 34 consistent with the present invention. The actuator 34 may include a plunger 36 which is axially reciprocable in the actuator body. The plunger 36 may contact the knob 26 and in its forward motion out of the actuator body, push the knob and its support shaft 24 from left to right as seen in the drawing. As the shaft 24 moves to the right, it may carry the fork 22 with it against spring pressure, and the splined ring may be moved from left to right to engage the splines on the exterior of the differential output shaft if they are aligned with the splines of the ring 18. The actuator 34 may be constructed in a manner similar to the actuators described U.S. Pat. No. 5,788,008, except that the actuator may include first and second blocked condition compliance springs as described in detail below. The teachings of U.S. Pat. No. 5,788,008 are hereby incorporated herein by reference.

Figure 2:
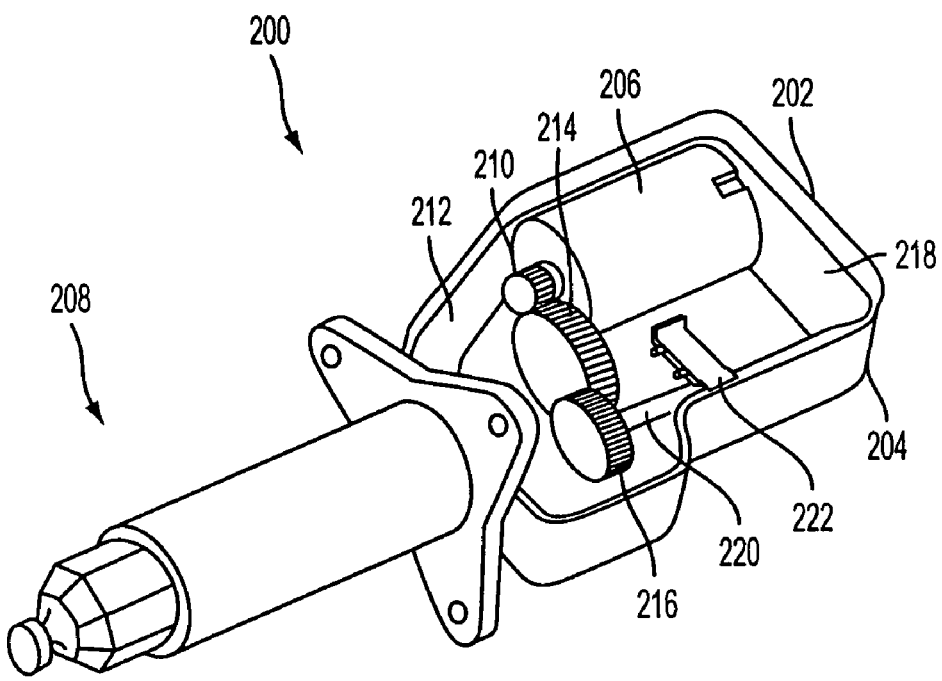
FIG. 2 is a perspective view of another exemplary embodiment of an actuator consistent with the invention showing a motor housing cover in phantom.

FIG. 2 is a perspective view another exemplary actuator 200 consistent with the invention showing a top cover 202 of a motor housing 204 in phantom. The actuator 200 is configured for push-pull operation, and is configured for operation when the plunger and/or a driven device driven by the plunger, e.g. a fork 22, is in a blocked condition. Basic drive for the device 200 may be provided by a reversible motor 206 which may be a 12V permanent magnet DC motor. The motor 206 may be disposed in the housing 204, which may be secured to an end of a plunger assembly 208, a suitable gasket 300 (FIG. 3) being provided between the two items. A pinion gear may be disposed on the output shaft of the motor 206 for driving a gear reduction set 212. In the illustrated exemplary, embodiment, the gear reduction set includes first 214 and second 216 compound gears in meshing engagement with each other.

Figure 3:
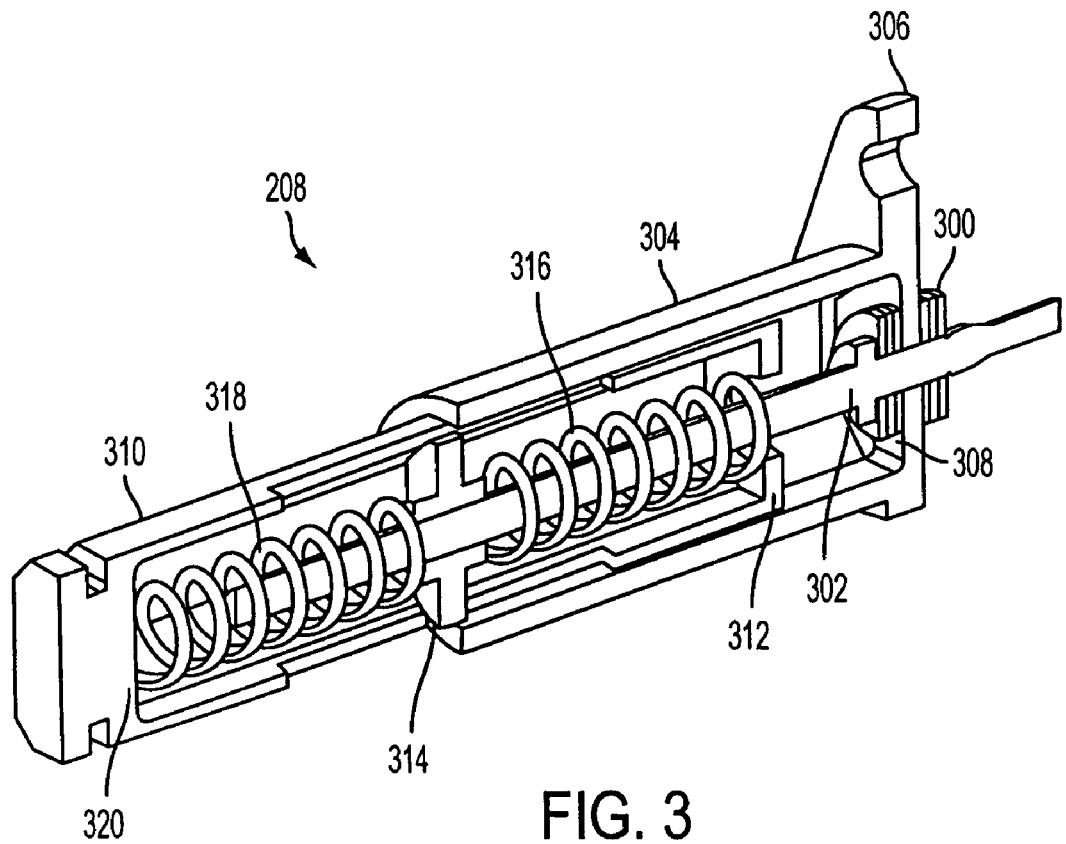
FIG. 3 is sectional view of a portion of the actuator shown in FIG. 2 including a plunger assembly consistent with the present invention.

A sectional view of the plunger assembly 208 is shown in FIG. 3. A drive screw 302 may be fixed in the center one of the compound gears 214, 216 to obtain a desired gear reduction. The drive screw 302 may extend through a plunger housing 304 which may include a mounting flange 306 either integral therewith or secured thereto. Seals 300, 308 may be provided on the inside and outside of the housing 304 where the drive screw 302 enters the housing.

A plunger 310 may be slidably disposed at least partially within the plunger housing 304 so that it may axially reciprocate therein, and the drive screw 302 may extend into the plunger through an end wall 312 thereof. A drive nut 314 may be disposed on the drive screw 302 within the plunger 310. A first compliance spring 316 may be disposed between the drive nut 314 and the end wall 312 of the plunger and a second compliance 318 spring may be disposed between the drive nut 314 and an opposed end wall 320 of the plunger 310. The compliance springs 316, 318 may be helical coil springs, as shown.

Under normal operating conditions, the plunger 310 may move along with the drive nut 304 to drive a driven member, e.g. a fork 22. When plunger travel is prohibited by a blocked condition, e.g. movement of the driven member is blocked, the coil springs 316, 318 inside the plunger allow the drive nut 314 to travel along the drive screw 302, while the plunger 310 remains stationary. As the drive nut 314 moves along the drive screw 302, it compresses one of the springs 316, 318, depending on drive screw rotation direction. When the blocked condition is cleared/removed, energy stored in the compressed spring 316 or 318 drives the plunger 310 into an equilibrium position between the two springs 316, 318.

Figure 4:
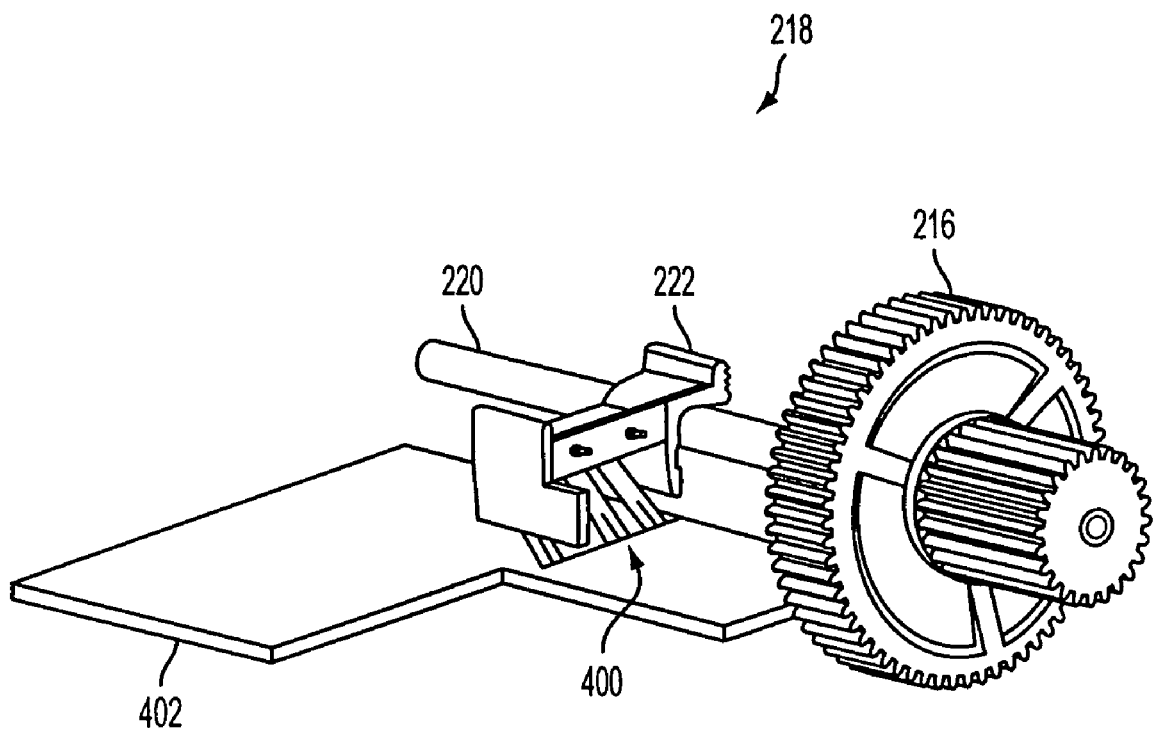
FIG. 4 is a perspective view of an exemplary contact wiper system consistent with the present invention.

Drive nut position may determined by a contact wiper system 218. As shown generally in FIG. 2 and more particularly in FIG. 4, the contact wiper system 218 may include a wiper drive screw 220 extending from the center of one of the gears 216 of the gear reduction train or another gear coupled to the gear reduction train. A wiper drive nut 222 may be disposed on the wiper drive screw 220 for reciprocating movement along the drive screw depending on the direction of rotation of the motor 206. Wiper contacts 400 may be mounted to the drive nut 222 and disposed over associated electrical contacts on a printed circuit board 402. The wiper drive screw 220 speed and position is directly proportional to that of the plunger drive screw 302. Thus, the positioning of the wiper contacts 400 on the traces on the printed circuit board 402 may open/close associated circuits to provide an indication as to the position of the plunger 310, and hence the state of the driven system. In one embodiment, for example, the circuits may be configured similar to the configuration shown in FIG. 4 of U.S. Pat. No. 5,788,008.

According to one aspect of the invention, there is thus provided a vehicle gear box shift actuator including a lead screw; a drive nut threaded on the lead screw; a plunger; a first spring disposed between the drive nut and a first end of the plunger; a second spring disposed between the drive nut and a second end of the plunger opposite from the first end; and a motor coupled to the lead screw. The drive nut is configured to move along the lead screw upon energization of the motor to cause corresponding movement of the plunger until the plunger is in a blocked condition. Upon occurrence of the blocked condition the drive nut is configured to move relative to the plunger to compress at least one of the first and second springs to store energy for returning the drive nut to an equilibrium position along the lead screw when the blocked condition is removed.

According to another aspect of the invention there is provided an apparatus for modifying the operating state of a vehicle gear box, the apparatus including a driven member movable between a first position wherein the vehicle gear box has a first operating state and a second position wherein the vehicle gear box has a second operating state; a plunger for moving the driven member to the first and second positions; a drive nut threaded on a lead screw and coupled to the plunger; a first spring disposed between the drive nut and a first end of the plunger; a second spring disposed between the drive nut and a second end of the plunger opposite from the first end; and a motor coupled to the lead screw. The drive nut is configured to move axially along the lead screw upon energization of the motor to cause corresponding movement of the plunger and the driven member until the driven member is in a blocked condition. Upon occurrence of the blocked condition the drive nut is configured to move relative to the plunger to compress at least one of the first and second springs to store energy for returning the drive nut to an equilibrium position along the lead screw when the blocked condition is removed.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. A vehicle gear box shift actuator comprising:
   a lead screw;
   a drive nut threaded on said lead screw;
   a plunger;
   a first spring disposed between said drive nut and a first end of said plunger;
   a second spring disposed between said drive nut and a second end of said plunger opposite from said first end; and
   a motor coupled to said lead screw,
   whereby said drive nut is configured to move along said lead screw upon energization of said motor to cause corresponding movement of said plunger until said plunger is in a blocked condition, wherein upon occurrence of said blocked condition said drive nut is configured to move relative to said plunger to compress at least one of said first and second springs to store energy for returning said plunger to an equilibrium position along said lead screw when said blocked condition is removed.

2. An actuator according to claim 1, wherein said motor is coupled to said lead screw through a gear train.

3. An actuator according to claim 2, wherein said gear train comprises:
   a wiper drive screw
   wiper drive nut threaded on said wiper drive screw;
   at least one wiper contact coupled to said wiper drive screw, each of said wiper contacts being positioned for engaging an associated electrical contact, whereby a position of said at least one wiper contact relative to said associated electrical contact is representative of a position of said drive nut on said lead screw.

4. An actuator according to claim 3, wherein said associated electrical contacts are disposed on a printed circuit board.

5. An actuator according to claim 1, wherein at least one of said first and second springs comprises a helical coil spring.

6. An actuator according to claim 1, wherein at said plunger is at least partially disposed within a housing and is extendable from said housing upon energization of said motor.

7. An actuator according to claim 1, wherein said motor is a reversible motor.

8. An apparatus for modifying the operating state of a vehicle gear box, said apparatus comprising:
- a driven member movable between a first position wherein said vehicle gear box has a first operating state and a second position wherein said vehicle gear box has a second operating state;
- a plunger for moving said driven member to said first and second positions;
- a drive nut threaded on a lead screw and coupled to said plunger;
- a first spring disposed between said drive nut and a first end of said plunger;
- a second spring disposed between said drive nut and a second end of said plunger opposite from said first end; and
- a motor coupled to said lead screw,
- whereby said drive nut is configured to move axially along said lead screw upon energization of said motor to cause corresponding movement of said plunger and said driven member until said driven member is in a blocked condition, wherein upon occurrence of said blocked condition said drive nut is configured to move relative to said plunger to compress at least one of said first and second springs to store energy for returning said plunger to an equilibrium position along said lead screw when said blocked condition is removed.

9. An apparatus according to claim 8, wherein said motor is coupled to said lead screw through a gear train.

10. An apparatus according to claim 9, wherein said gear train comprises:
- a wiper drive screw
- wiper drive nut threaded on said wiper drive screw;
- at least one wiper contact coupled to said wiper drive screw, each of said wiper contacts being positioned for engaging an associated electrical contact, whereby a position of said at least one wiper contact relative to said associated electrical contact is representative of a position of said drive nut on said lead screw.

11. An apparatus according to claim 10, wherein said associated electrical contacts are disposed on a printed circuit board.

12. An apparatus according to claim 8, wherein at least one of said first and second springs comprises a helical coil spring.

13. An apparatus according to claim 8, wherein at said plunger is at least partially disposed within a housing and is extendable from said housing upon energization of said motor.

14. An apparatus according to claim 8, wherein said motor is a reversible motor.

15. An apparatus according to claim 8, wherein said vehicle gear box comprises a front differential housing.

16. An apparatus according to claim 8, wherein said first operating state comprises a 2-wheel drive operating state of said vehicle and said second operating state comprises a 4-wheel drive operating state of said vehicle.

* * * * *